(12) United States Patent
Fujimoto et al.

(10) Patent No.: US 8,312,350 B2
(45) Date of Patent: Nov. 13, 2012

(54) MOBILE COMMUNICATION APPARATUS

(75) Inventors: Toshifumi Fujimoto, Kawasaki (JP);
Takashi Kamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 12/567,488

(22) Filed: Sep. 25, 2009

(65) Prior Publication Data
US 2010/0083067 A1   Apr. 1, 2010

Related U.S. Application Data

(63) Continuation of application No. PCT/JP2007/000329, filed on Mar. 29, 2007.

(51) Int. Cl.
*H03M 13/00* (2006.01)
(52) U.S. Cl. ......................................... 714/775; 714/748
(58) Field of Classification Search .................. 714/748, 714/775
See application file for complete search history.

(56) References Cited

U.S. PATENT DOCUMENTS

| | | | |
|---|---|---|---|
| 6,233,248 B1* | 5/2001 | Sautter et al. | 370/465 |
| 7,099,300 B2 | 8/2006 | Sugaya | |
| 7,103,817 B1* | 9/2006 | Choksi | 714/748 |
| 7,936,664 B2* | 5/2011 | Zhu et al. | 370/216 |
| 2002/0159432 A1 | 10/2002 | Sugaya | |
| 2004/0014452 A1* | 1/2004 | Lim et al. | 455/403 |
| 2005/0229071 A1* | 10/2005 | Uga | 714/748 |
| 2005/0249120 A1 | 11/2005 | Heo et al. | |
| 2006/0092973 A1 | 5/2006 | Petrovic et al. | |
| 2006/0251083 A1 | 11/2006 | Sugaya | |

FOREIGN PATENT DOCUMENTS

| | | |
|---|---|---|
| JP | 09214507 | 8/1997 |
| JP | 2000069547 | 3/2000 |
| JP | 2002261774 | 9/2002 |
| JP | 2005323366 | 11/2005 |
| JP | 2005536159 | 11/2005 |

OTHER PUBLICATIONS

International Search Report dated Jun. 19, 2007.

* cited by examiner

*Primary Examiner* — Charles Ehne
(74) *Attorney, Agent, or Firm* — Murphy & King, P.C.

(57) ABSTRACT

In a mobile communication system, when a receiving condition is deteriorated to the extent that reception does not succeed even by means of combination after retransmission to the maximum number of retransmissions, a transmission rate is restricted by reducing radio frames assignable to new data, and by setting dedicated retransmission frames, to which retransmission data are assignable, over the maximum number of retransmissions for the reduced transmission rate, thereby enabling a greater number of retransmissions than the maximum number of retransmissions without an increase of a buffer size. By this, a combination gain through retransmission is improved and a retransmission failure rate is decreased.

12 Claims, 17 Drawing Sheets

FIG. 6

Maximum number of retransmissions = 5, RTT = 8 radio frames

| Present state No. | Mean value for N sections of RTT × the maximum number of retransmissions | | Contents of transmission rate adjustment | | | | Remarks |
|---|---|---|---|---|---|---|---|
| | Number of retransmissions ended in failure (Y) | Number of retransmissions in the case of normal reception (X) | Number of frames assignable to new data /RTT | Number of dedicated retransmission frames /RTT | Increment of the number of retransmissions in the section of (RTT × the maximum number of retransmissions) | Increment of the number of retransmissions per process ID in the section of (RTT × the maximum number of retransmissions) | |
| 01 | Transition to No. 02 when 4≤Y | — | 8 | 0 | 0 | 0 | No dedicated retransmission frame is assigned. |
| 02 | Transition to No. 03 when 3≤Y | Transition to No. 01 when Y=0 and 0≤X < the maximum number of retransmissions. | 6 | 2 | 10 | 1.6(=A1) | The maximum number of retransmissions per radio frame is increased by 1.3 times. |
| 03 | Transition to No. 04 when 2≤Y | Transition to No. 02 when Y=0 and 0≤X < the maximum number of retransmissions + A1. | 4 | 4 | 20 | 5(=A2) | The maximum number of retransmissions per radio frame is increased by 2 times. |
| 04 | Transition to No. 05 when 2≤Y | Transition to No. 03 when Y=0 and 0≤X < the maximum number of retransmissions + A2. | 3 | 5 | 25 | 8.3(=A3) | The maximum number of retransmissions per radio frame is increased by 2.6 times. |
| 05 | Transition to No. 06 when 1≤Y | Transition to No. 04 when Y=0 and 0≤X < the maximum number of retransmissions + A3. | 2 | 6 | 30 | 15(=A4) | The maximum number of retransmissions per radio frame is increased by 4 times. |
| 06 | — | Transition to No. 05 when Y=0 and 0≤X < the maximum number of retransmissions + A4. | 1 | 8 | 35 | 35(=A5) | The maximum number of retransmissions per radio frame is increased by 8 times. |

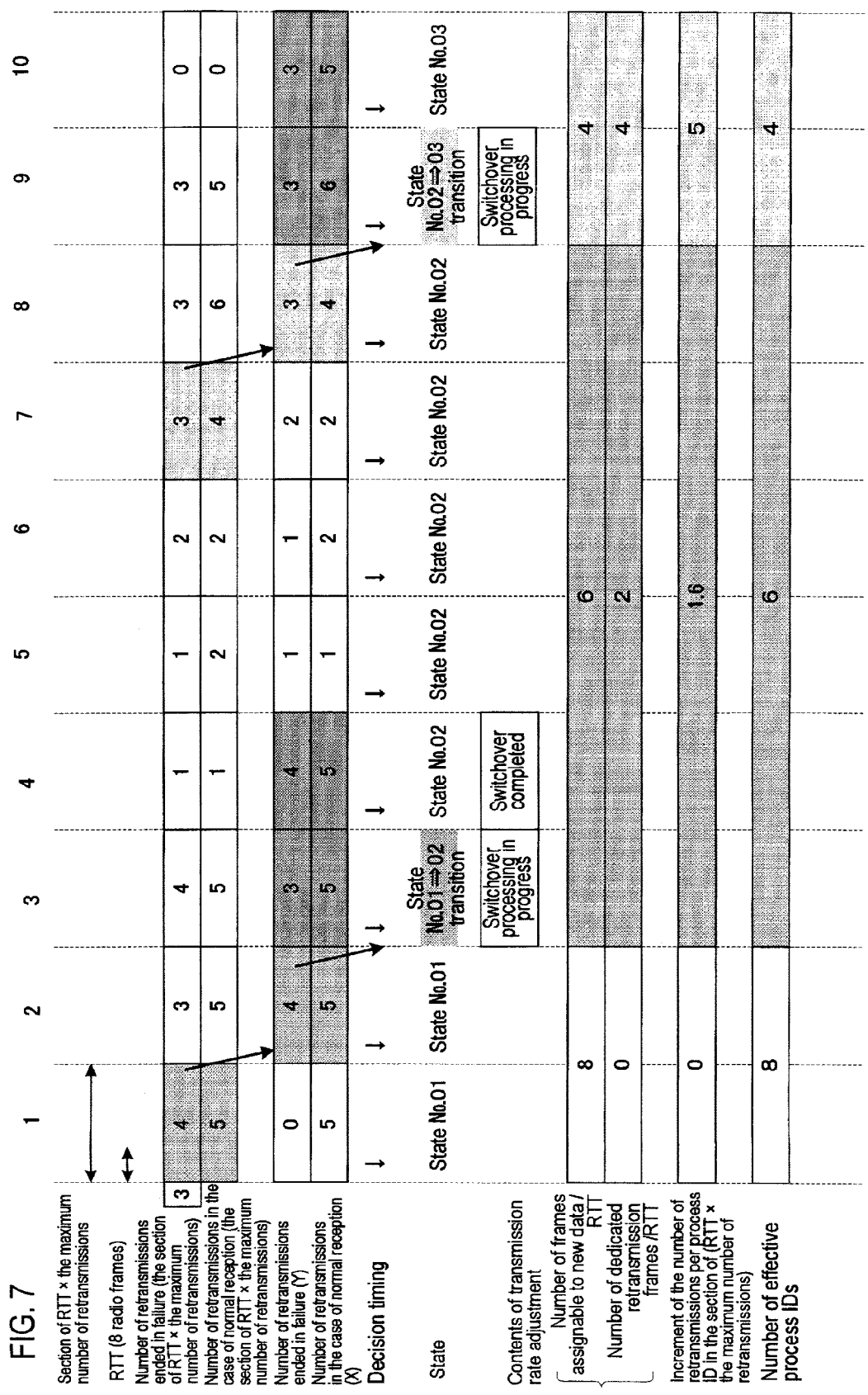

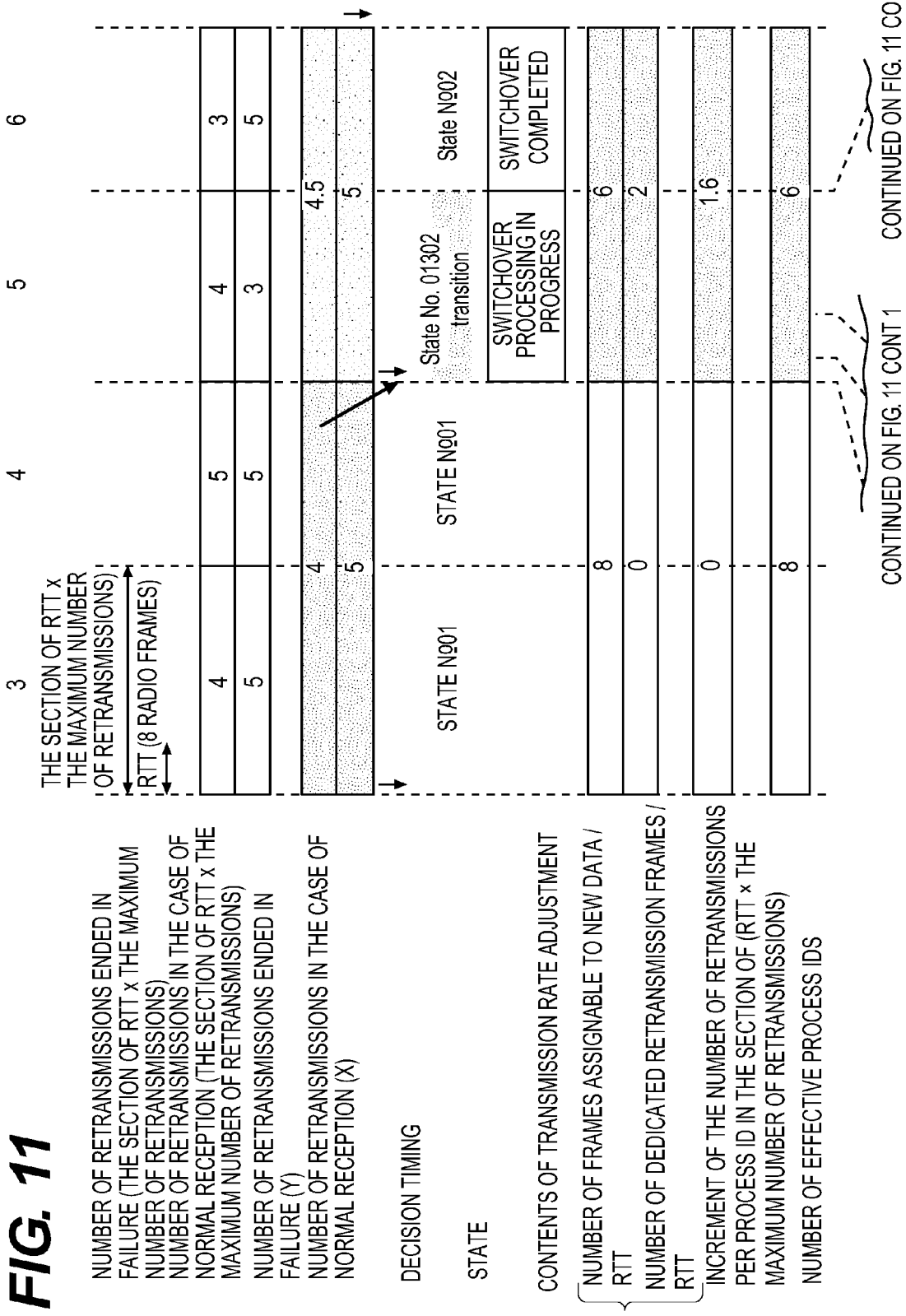

FIG. 13

| Process ID | New data identifier | ACK/NACK information | Decision result on the necessity for setting dedicated retransmission frames | SINR information | Other control information |

MOBILE COMMUNICATION APPARATUS

CROSS REFERENCE TO RELATED APPLICATIONS

This application is a continuation of International Application No. PCT/JP2007/000329, filed on Mar. 29, 2007, now pending, herein incorporated by reference.

FIELD

The embodiments discussed herein are related to mobile communication apparatus having a data retransmission control function.

BACKGROUND ART

In a mobile communication system, high-speed data communication is required to cope with a mobile multimedia service such as Internet connection. Retransmission control is used as a means for efficient transmission of packet data for high-speed data communication. The retransmission control (ARQ: Automatic Repeat Request) is a technique applied when an error is detected in a received packet on the receiving side, so as to request the transmission side to transmit the packet concerned.

Further, there has been put into practical use the hybrid ARQ (H-ARQ), in which ARQ is combined with an error correction code (FEC: Forward Error Correction). At present, as a third-generation (3G) radio communication system, W-CDMA is widespread, and H-ARQ is also adopted to HSDPA (High-Speed Downlink Packet Access) by which high-speed (14 Mbps maximum) W-CDMA data communication is attained.

IN H-ARQ, the receiving side performs error correction processing prior to error detection, and when it is decided that the reception is successful (without an error), an ACK (decision of normality) is transmitted to the transmitting side, while when a reception failure (inclusive of an error) is decided, a NACK (decision of abnormality) is transmitted to the transmitting side, so that the retransmission of the packet data is requested. The transmitting side retransmits the packet data corresponding to the received NACK.

Further, in H-ARQ, the receiving side stores into a buffer the packet data in which an error is detected, so as to perform packet combination processing to combine with the retransmitted packet data. By that the receiving side combines with the packet data stored in the buffer when receiving the retransmitted packet data, the reception quality is improved, and as the number of retransmissions increases, the degree of improvement is increased, and the rate of successful packet data reception is increased.

Further, in the above retransmission processing, the transmitting side receives ACK/NACK information from the receiving side after the data for one radio frame is transmitted from the transmitting side. By using, as a unit of processing, a plurality of radio frames transmittable within a time (RTT: Round Trip Time) before the completion of the retransmission decision of the radio frame data concerned, the retransmission decision and the retransmission are performed on the basis of each radio frame.

Usually, as retransmission management information, a process ID/new data identifier (1 bit) is assigned to each radio frame in RTT, and retransmission management is performed on the basis of each process ID. Namely, at the time of data transmission, the retransmission management information is added to a control channel to be transmitted in an identical frame, so that the receiving side is informed. On the receiving side, combination processing, decoding processing and reception decision of the retransmitted data are performed on the basis of each process ID. The reception decision result is reported to the transmitting side as ACK/NACK information, as described above. Here, because the transmitting side already knows the process ID of the data having been transmitted before the RTT in which the ACK/NACK information is to be received, the notification of the process ID information together with the ACK/NACK information is unnecessary. Further, on the transmitting side, when the transmission data (data in a retransmission buffer) managed on the basis of each process ID is switched from the retransmission data to the next new data (the process ID is released when the retransmission of the transmission data managed by the process ID concerned is completed, or when it is decided that the retransmission failed even after reaching the maximum number of retransmissions. The released process ID is then assigned to the next new transmission data, and thereby the retransmission control for the next new transmission data is started), the notification to the receiving side is performed by the transmission of the new data identifier with an inverted logic. On the receiving side, by the detection of a change of the new data identifier, the retransmission processing of the process ID concerned is completed, and the start of reception of the next new data is identified.

Further, the receiving side once stores a plurality of radio frame data, of which reception after the retransmission processing is decided to be successful, into a sequence control buffer, and performs processing (sequence control processing) to restore the sequence of the radio frame data having been changed by the retransmission processing. In regard to the above sequence control buffer, there is required an extremely large size enough to store the entire decoded data of the number of radio frames transmittable and receivable during the time of (RTT×the maximum number of retransmissions). Because of a limited hardware scale on the receiving side, there is an upper limit of a mountable memory size, and accordingly, in the present state, the upper limit of the maximum number of retransmissions in the apparatus is determined by the above limitation.

FIGS. 1 through 4 are diagrams illustrating a variety of exemplary states in the retransmission processing of the related art. FIG. 1 illustrates a case under a good reception quality state, in which no retransmission occurs. FIG. 2 illustrates a case under a reception quality state being deteriorated to a certain extent, such that retransmissions occur in several frames, and however, the entire reception is successful. Also, FIG. 3 illustrates a case under a state that the reception quality is further deteriorated, such that the retransmissions fail even after reaching the maximum number of retransmissions. FIG. 4 illustrates a case under the state of the reception quality exceedingly deteriorated as compared to FIG. 3, such that the ratio of the radio frames, of which retransmissions fail even after reaching the maximum number of retransmissions, increases.

More specifically, in FIG. 1, RTT=8 radio frames, and transmission data Dn (n=1, 2, 3, . . . ) are transmitted from the transmitting side in each radio frame. On the receiving side, the transmission data Dn are received after 3 radio frames. The receiving side receives each transmission data Dn entirely normally through a single reception, and based on ACK from the receiving side, the transmitting side further transmits a new transmission data Dn. As in the case illustrated in FIG. 1, when no retransmission occurs, the entire 8 radio frames are assigned to the transmission of new data, and transmission under the maximum rate is carried out accordingly.

In FIG. 2, retransmissions occur in regard to transmission data D3, D4 and D7. In regard to the transmission data D3 and D7, normal reception is attained by the first retransmission (the second transmission), while in regard to the transmission data D4, normal reception is attained by the second retransmission (the third transmission). When the retransmission of the transmission data Dn is performed, the number of radio frames assigned to the transmission of new data is reduced by that amount, and therefore, the transmission rate is decreased as compared to the case of FIG. 1. Further, when the maximum number of retransmissions is assumed to be 5 for example, in FIG. 2, the entire transmission data Dn are received normally by means of the retransmissions within the maximum number of retransmissions.

In FIG. 3, normal reception is not attained even when the number of retransmissions of the transmission data D4 reaches the maximum number of retransmissions (5), and therefore, a process ID 3 of the radio frame having been assigned to the transmission data D4 is released, and a new transmission data D11 is assigned to the radio frame concerned. Also, in regard to the transmission data D3, normal reception is attained at the time of the maximum number of retransmissions. By this, a radio frame process ID 2 having been assigned to the transmission data D3 is released, and a new transmission data D17 is assigned to the radio frame concerned. Here, transmission data other than D3 and D4 are received normally in one retransmission or less.

In FIG. 4, normal reception is not attained even if the number of retransmissions of the transmission data D4, D5 reaches the maximum number of retransmissions (5), and therefore, each process ID 3, 4 of the radio frames having been assigned to the transmission data D4, d5 is released, and new transmission data D9, D10 are assigned to the radio frames concerned. Further, in regard to the transmission data D3, normal reception is attained at the time of the maximum number of retransmissions. By this, the radio frame process ID 2 having been assigned to the transmission data D3 is released, and a new transmission data D11 is assigned to the radio frame concerned. Also, in regard to the transmission data other than the transmission data D3, 4, 5, there are relatively a large number of retransmission failures (NACK), and retransmission is repeated accordingly. Thus, as compared to the case illustrated in FIG. 3, there are a smaller number of radio frames assigned to the new data.

Additionally, in the patent document 1 illustrated below, instead of managing data retransmission on a packet-by-packet (data-by-data in the unit of a radio frame) basis as illustrated in FIGS. 1 through 4, there is disclosed retransmission control in which a frame period to perform retransmission is set in advance, and when the above frame period arrives, only a packet(s) on which ACK has not been received is retransmitted.

[Patent document 1] Japanese Laid-open Patent Publication No. 2002-261774.

SUMMARY

According to an aspect of the invention, a apparatus includes a mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising: a setting unit setting a portion of the plurality of radio frames to be a dedicated retransmission frame according to a data reception quality level at the receiving side apparatus; and a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response, wherein, by setting the dedicated retransmission frame, the number of capable retransmissions of the data is made to increase more than the maximum number of retransmissions before the dedicated retransmission frame is set.

The object and advantages of the invention will be realized and attained by means of the elements and combinations particularly pointed out in the claims. It is to be understood that the both the forgoing general description and the following detailed description are exemplary and explanatory and are not restrictive of the invention, as claimed.

BRIEF DESCRIPTION OF THE DRAWINGS

FIG. 6 is a diagram illustrating a decision table for setting a dedicated retransmission frame.

FIG. 7 is a diagram illustrating a first example (N=1) of retransmission processing according to the embodiment of the present invention.

FIG. 13 is a diagram illustrating retransmission management information which is reported using the control channel

DESCRIPTION OF EMBODIMENTS

As described previously in the case illustrated in FIG. 4, under the circumstances of deteriorated reception quality, in which error correction cannot be made even by means of the retransmissions to the maximum number of retransmissions, if the reception quality further proceeds to the direction of deterioration, retransmission failures gradually occur more frequently because of the incapability of normal retransmission, combination and data decoding, and as a result, the transmission rate of the new data decreases, as the number of radio frames assigned to the retransmission data increases.

Further, in the case of bad reception quality, the radio frame assigned to retransmission data having reached to the maximum number of retransmissions is in a state of having high possibility of a transmission failure again in the retransmission, and nevertheless, the radio frame concerned is assigned to the transmission of a next new data. This leads to a retransmission, and brings about further degradation of the transmission efficiency.

On the other hand, according to the conventional retransmission control system, the maximum number of retransmissions depends on a limited hardware scale of the memory (sequence control buffer) on the receiving side, which makes it impossible to increase the number of retransmissions, and accordingly, the improvement of a combination gain through retransmission cannot be expected.

Preferred embodiments of the present invention will be explained with reference to accompanying drawings.

Figure 5:
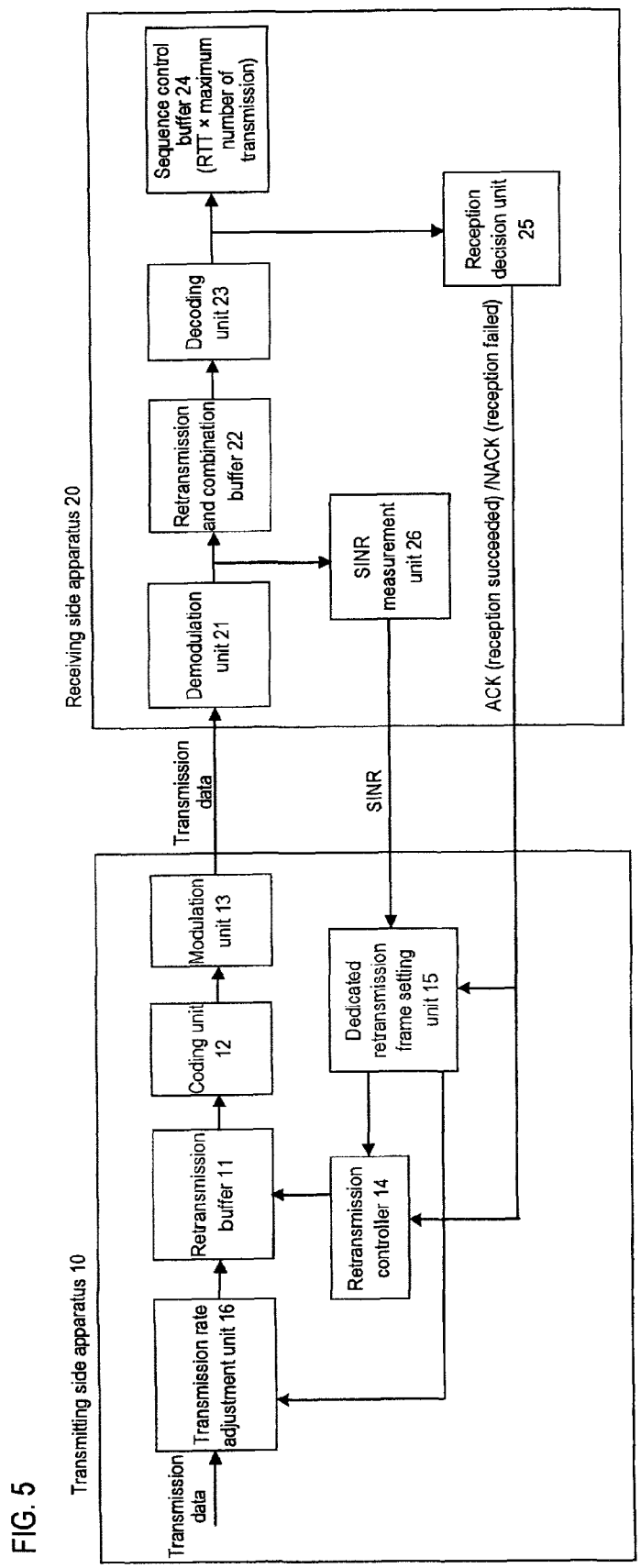
FIG. 5 is a diagram illustrating an exemplary configuration of a mobile communication system according to an embodiment of the present invention.

FIG. 5 is a diagram illustrating an exemplary configuration of a mobile communication system according to an embodiment of the present invention. The mobile communication system is configured of mobile communication apparatus on the transmitting side and mobile communication apparatus on the receiving side, and the mobile communication apparatus is a mobile unit or a radio base station unit in the mobile communication system. In case of uplink communication from the mobile unit to the radio base station unit, the mobile unit becomes mobile communication apparatus 10 on the transmitting side (hereafter, transmitting side apparatus 10), while the radio base station unit becomes mobile communication apparatus 20 on the receiving side (hereafter, receiving side apparatus 20). Also, incase of downlink communication from the radio base station unit to the mobile unit, the radio base station unit becomes the transmitting side apparatus 10, and the mobile unit becomes the receiving side apparatus 20. Hereinafter, the communication direction is not distinguished, and therefore the mobile unit and the radio base station unit are described as one of the transmitting side apparatus 10 and the receiving side apparatus 20 and the other, respectively.

In the transmitting side apparatus 10, a retransmission buffer 11 is a buffer for storing data to be transmitted, in which, the data concerned is stored even after data transmission, until an ACK for the data concerned is received. A Coding unit 12 adds error decision information such as CRC to the data, and encodes data using a coding parameter including an error correction code (FEC). A Modulation unit 13 modulates and transmits the encoded data.

A retransmission controller 14 receives ACK/NACK from the receiving side apparatus 20, and on receipt of NACK, the retransmission controller 14 reads out data corresponding to the above NACK from retransmission buffer 11, so as to retransmit.

A dedicated retransmission frame setting unit 15, which is a characteristic function in the present invention, receives ACK/NACK from the receiving side apparatus 20 and SINR in regard to the data received by the receiving side apparatus 20 (or may be either one of the above). Then, on deciding therefrom that data receiving condition at the receiving side apparatus 20 is in a deteriorated state, the dedicated retransmission frame setting unit 15 sets a portion of a plurality of radio frames during RTT (for example, 8 radio frames) to a radio frame(s) dedicated for retransmission (hereafter referred to as dedicated retransmission frame). To each dedicated retransmission frame, a new data is not assigned, and instead, only a retransmission data is assigned. As a result, the transmission rate of the new data is reduced, and however, a retransmission(s) exceeding the maximum number of retransmissions becomes possible, and thereby it is possible to increase the possibility of normal reception of the retransmitted data. Further, although the transmission rate is reduced, it is possible to reduce a reception failure probability of the new data having high possibility of the reception failure.

In the state that a data reception condition is deteriorated, it is highly possible that the reception of a new data may fail even when the new data is assigned to a radio frame. From another viewpoint, as the number of data retransmissions is increased, the combination gain through retransmission is improved, which increases the probability of successful reception. Therefore, when normal reception could not be attained even when the number of retransmissions has reached the maximum number of retransmissions, it is possible to increase the possibility of normal data reception if a radio frame is used for the retransmission of the retransmitted data, rather than that the radio frame of the retransmitted data is released and the radio frame concerned is assigned to a new data. Accordingly, it is possible to intend efficient usage of the radio frames.

When the dedicated retransmission frame is set, the dedicated retransmission frame setting unit 15 reports to a Transmission rate adjustment unit 16 the process ID of a radio frame (radio frame other than the dedicated retransmission frame) to which a new data is assignable. When the reported process ID is released, the Transmission rate adjustment unit 16 assigns the new data to the radio frame having the process ID concerned.

Also, when the dedicated retransmission frame is set, the dedicated retransmission frame setting unit 15 reports the process ID of the dedicated retransmission frame to the retransmission controller 14. The retransmission controller 14 then assigns, to the dedicated retransmission frame, a retransmission data of which normal reception could not be attained even after the retransmissions were carried out for the maximum number of retransmissions, so as to further retransmit the data concerned. The control and the operation of the dedicated retransmission frame setting unit 15 will be described later.

On receipt of data from the transmitting side apparatus 10, a decoding unit 21 of the receiving side apparatus 20 decodes the data, so as to store into a retransmission and combination buffer 22, and then, a decoding unit 23 decodes the retransmitted and combined data. The decoded data is stored into a sequence control buffer 24. The memory capacity of the sequence control buffer 24 is relatively large, and the upper limit of the memory capacity is also determined from the limit of the hardware scale. According to the above memory capacity of the sequence control buffer 24, the upper limit of the maximum number of retransmissions is determined compulsively.

A reception decision unit 25 performs the decision of a reception success/failure by performing the CRC check of the decoded data, and transmits ACK to the receiving side apparatus 20 in the case of successful reception, or transmits NACK to the receiving side apparatus 20 in the case of reception failure. Additionally, an SINR measurement unit 26 measures SINR (Signal Noise Ratio) of the decoded data, and transmits the measurement result to the transmitting side apparatus 10.

According to the embodiment, by setting the dedicated retransmission frame based on the reception success/failure decision result in the receiving side apparatus 20 in the above configuration, efficient retransmission control according to reception quality is realized by means of a reduced transmission rate of new data and an increased number of retransmissions of retransmission data. More detailed description will be given below.

FIG. 6 is a diagram illustrating a decision table for setting a dedicated retransmission frame. The dedicated retransmission frame setting unit 15 retains the above table, so as to set the dedicated retransmission frame based on the decision table illustrated in FIG. 6.

In the decision table illustrated in FIG. 6, the number of retransmissions ended in failure and the number of retransmissions in the case of normal reception based on ACK/NACK are used as a decision criterion of the reception quality in the receiving side apparatus 20. The number of retransmissions ended in failure is the number of process IDs not normally received in the receiving side apparatus 20, even after retransmissions were performed to the maximum number of retransmissions in the period of (RTT×the maximum number of retransmissions). The number of retransmissions in the case of normal reception is a mean value of the number of retransmissions of each process ID at the time point when data could be received normally in the receiving side apparatus 20 in the period of (RTT×the maximum number of retransmissions). Additionally, in case that normal reception is attained at the first new transmission, the number of retransmissions=0. Here, although each unit measurement period of the number of retransmissions ended in failure and the number of retransmissions in the case of normal reception is (RTT×the maximum number of retransmissions), it may also be possible to measure each number of times during an N-fold (N=1, 2, 3, . . . ) period of the above measurement period, so as to use a mean value per unit measurement period. Accordingly, the decision period becomes (RTT×the maximum number of retransmissions×N). In addition, in the example illustrated in FIG. 6, the maximum number of retransmissions is set to be 5, and also, RTT=8 radio frames.

An initial state is a state 01, and in the state 01, no dedicated retransmission frame is assigned in 8 radio frames. Namely, it is possible to assign new data to the entire 8 radio frames. In the state 01, if the number of retransmissions ended in failure (Y) is four times or more, a transition to a state 02 occurs. A case that the number of retransmissions ended in failure (Y) is 4 or more signifies a case that reception is not successful despite that retransmissions are performed to the maximum number of retransmissions in the half of the radio frames or more among 8 radio frames, which is a state that the reception quality is degraded.

On the occurrence of the transition to the state 02, 2 dedicated retransmission frames relative to 8 radio frames are assigned. Accordingly, among 8 radio frames, the number of radio frames being assignable to new data transmission, namely the number of process IDs being assignable to the new data, becomes 6.

By the assignment of 2 dedicated retransmission frames, in the period of (RTT×the maximum number of retransmissions), the number of retransmissions is increased by 2×5=10. Because the number of process IDs assignable to new data is 6, according to calculation, the number of retransmissions of approximately 1.6 (10/6) is increased per process ID. Therefore, in addition to the maximum number of retransmissions of 5, the number of retransmissions of approximately 6.6 is secured. The increase rate of the number of retransmissions is approximately 1.3 (6.6/5) times.

By the transition from the state 01 to the state 02, the number of retransmissions is increased, and accordingly, further improvement of the gain through the retransmission and combination processing can be expected, and the possibility of successful reception is increased. On the other hand, if new data is assigned to a radio frame having a high possibility of reception failure, it is highly possible that a further reception failure be produced. Accordingly, by decreasing the transmission rate, wasteful assignment of radio resources to new data can be restricted.

In the state 02, when the number of retransmissions ended in failure is 3 or greater, a transition to a state 03 occurs. A case that the number of retransmissions ended in failure (Y) is 3 or more is a case that reception is not successful despite that retransmissions are carried out to the maximum number of retransmissions in the half of the radio frames or more, among 6 radio frames being assignable to new data. This signifies a state that the reception quality is further degraded, as compared to the state 02.

On the occurrence of the transition to the state 03, 4 dedicated retransmission frames relative to 8 radio frames are assigned. Accordingly, among 8 radio frames, the number of radio frames being assignable to new data transmission, namely the number of process IDs assignable to the new data, becomes 4.

By the assignment of 4 dedicated retransmission frames, in the period of (RTT×the maximum number of retransmissions), the number of retransmissions is increased by 4×5=20. Because the number of process IDs assignable to new data is 4, according to calculation, the number of retransmissions of approximately 5 (20/4) is increased per process ID in comparison with the state 01. Therefore, in addition to the maximum number of retransmissions of 5, the number of retransmissions of approximately 10 is secured. The increase rate of the number of retransmissions is twofold (10/5).

Further, in the state 02, if the number of retransmissions ended in failure (Y)=0 and the number of retransmissions in the case of normal reception (X) is smaller than the maximum number of retransmissions, the state is restored to the state 01. The reason is that, in the entire 6 radio frames being assignable to new data, because the reception succeeded by the retransmissions of lower than the maximum number of retransmissions, the reception quality is considered to have been improved to the extent that reception becomes successful by the retransmission within the maximum number of retransmissions, even if the radio frames being assignable to new data are increased.

As to the state 03 and after, situations are similar. Namely, in the state 03, if the number of retransmissions ended in failure (Y) is 2 or greater, a transition to a state 04 occurs. On the occurrence of the transition to the state 04, 5 dedicated retransmission frames relative to 8 radio frames are assigned. Accordingly, among 8 radio frames, the number of radio frames being assignable to new data becomes 3. Namely, the number of process IDs assignable to the new data becomes 3. Also, in the state 03, if the number of retransmissions ended in failure (Y)=0 and the number of retransmissions in the case of normal reception (X) is smaller than the maximum number of retransmissions+A1 (=6.6), a transition to the state 02 occurs.

Further, in the state 04, if the number of retransmissions ended in failure (Y) is 2 or greater, a transition to a state 05 occurs. On the occurrence of the transition to the state 05, 6 dedicated retransmission frames relative to 8 radio frames are as signed. Accordingly, among 8 radio frames, the number of radio frames being assignable to new data, namely the number of process IDs assignable to the new data, becomes 2. Also, in the state 04, if the number of retransmissions ended in failure (Y)=0 and the number of retransmissions in the case of normal reception (X) is smaller than the maximum number of retransmissions+A2 (=10), a transition to the state 03 occurs.

Further, in the state 05, if the number of retransmissions ended in failure (Y) is 1 or greater, a transition to a state 06 occurs. On the occurrence of the transition to the state 06, 7 dedicated retransmission frames relative to 8 radio frames are as signed. Accordingly, among 8 radio frames, the number of radio frames being assignable to new data, namely the number of process IDs assignable to the new data, becomes 1. The state 06 is a state having the worst reception quality, and because the number of process IDs being assignable to new data cannot be set to zero, the state 06 becomes a state having the lowest transmission rate. Also, in the state 05, if the number of retransmissions ended in failure (Y)=0 and the number of retransmissions in the case of normal reception (X) is smaller than the maximum number of retransmissions+A3 (=13.3), a transition to the state 04 occurs.

Further, in the state 06, if the number of retransmissions ended in failure (Y)=0 and the number of retransmissions in the case of normal reception (X) is smaller than the maximum number of retransmissions+A4 (=20), a transition to the state 05 occurs. In the following, the retransmission processing according to the present embodiment based on the decision table illustrated in FIG. 6 will be described.

FIG. 7 is a diagram illustrating a first example (N=1) of retransmission processing according to the embodiment of the present invention. In FIG. 7, the retransmission processing in case of the transitions of the state 01→the state 02→the state 03 is illustrated. Each section is a section of RTT×the maximum number of retransmissions, where N=1 is taken. The section 1 is in the state 01, in which the number of radio frames assignable to new data (=the number of effective process IDs) is 8, and the number of dedicated retransmission frames is zero. In the section 1 of the state 01, when the reception quality is deteriorated and it becomes that the number of retransmissions ended in failure (Y)=4, in the next section 2, the above number of retransmissions ended in failure (Y)=4 is detected, based on the decision table illustrated in FIG. 4. In the section 2 also, the state 01 remains unchanged. Then, in the next section 3, a transition from the state 01 to the state 02 occurs, and in the section 4, the transition to the state 02 is completed, and thus, 2 dedicated retransmission frames are set.

The reason why the time of one section is needed for the state transition is that (RTT×the maximum number of retransmissions) is maximally necessary to release the entire process IDs (0-7). When a new data is assigned to a certain process ID and the above new data is retransmitted, if reception failure continues, the process ID is not released until the retransmissions are carried out for the maximum number of retransmissions.

Further, because 2 dedicated retransmission frames are set in the transition of the section 3 from the state 01 to the state 02, at the time point when, for example, the process IDs 6, 7 among 8 process IDs 0-7 are released, the assignment of new data is restricted by making the above released process IDs unused, and the dedicated retransmission frame setting unit 15 sets radio frames corresponding to the process IDs 6, 7 to be dedicated retransmission frames. When it becomes the section 04 of the state 02, the Transmission rate adjustment unit 16 does not assign new data to the dedicated retransmission frames. On the other hand, the retransmission controller 14 assigns, to a dedicated retransmission frame, the retransmission data of which reception failed even after the retransmissions are carried out for the maximum number of retransmissions.

Further, in the section 7 of the state 02, when the reception quality is further deteriorated and it becomes that the number of retransmissions ended in failure (Y)=3, in the next section 8, the above number of retransmissions ended in failure (Y)=3 is detected. In the section 8 also, the state 02 remains unchanged. Then, in the next section 9, a transition from the state 02 to the state 03 occurs, and in the section 10, the transition to the state 03 is completed, in which 4 dedicated retransmission frames are set. The operation at the transition from the state 02 to the state 03 is similar to the operation from the state 01 to the state 02. Namely, each time the process ID is released, by making unused the process IDs as many as the number to be set, each radio frame corresponding to the above process ID is set to be a dedicated retransmission frame.

Figure 8:
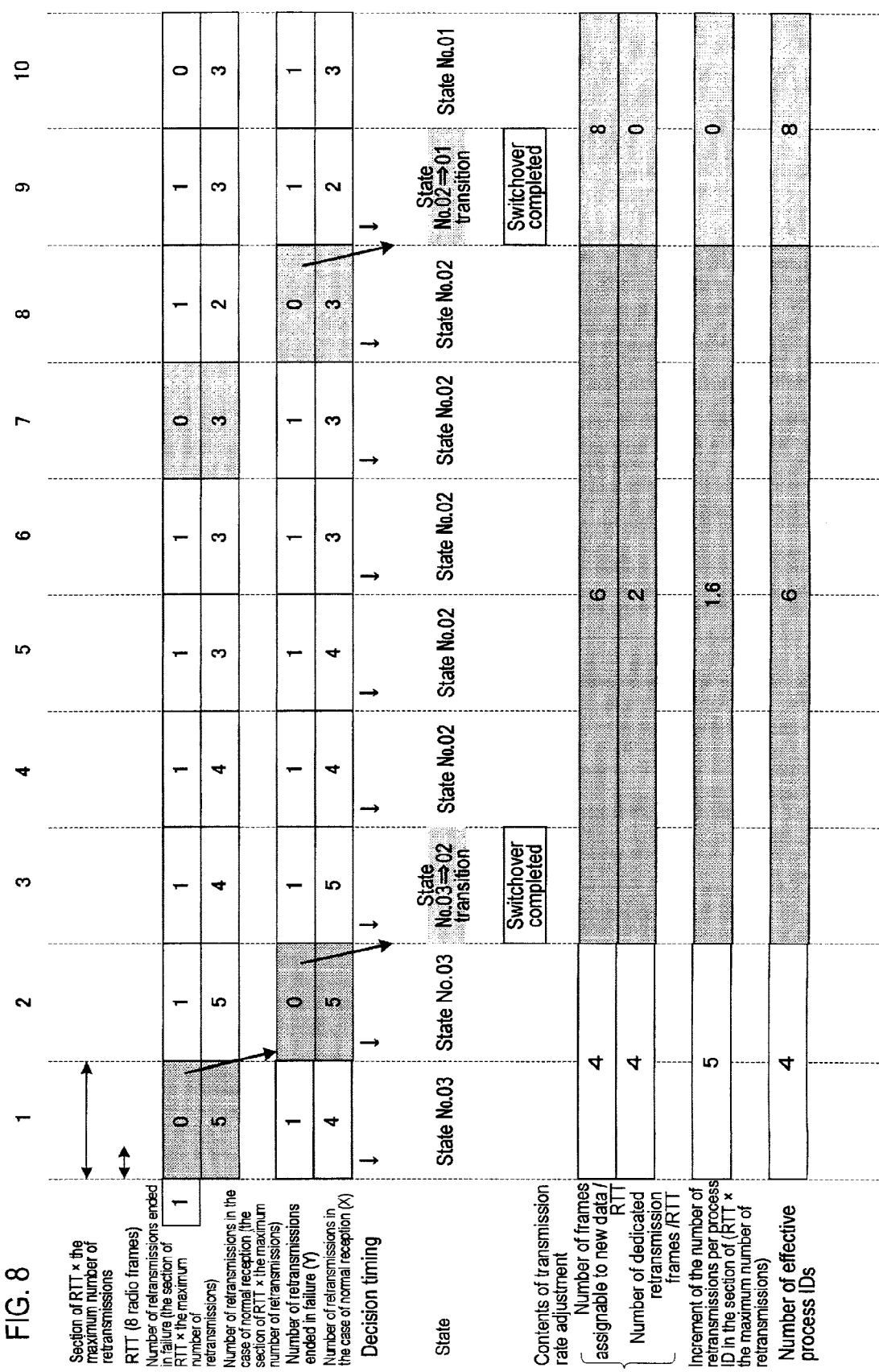
FIG. 8 is a diagram illustrating a second example (N=1) of the retransmission processing according to the embodiment of the present invention.

FIG. 8 is a diagram illustrating a second example (N=1) of the retransmission processing according to the embodiment of the present invention. Opposite to FIG. 7, FIG. 8 illustrates the retransmission processing in case of the transitions of the state 03→the state 02→the state 01. Various conditions are identical to the case illustrated in FIG. 7.

Figure 1:
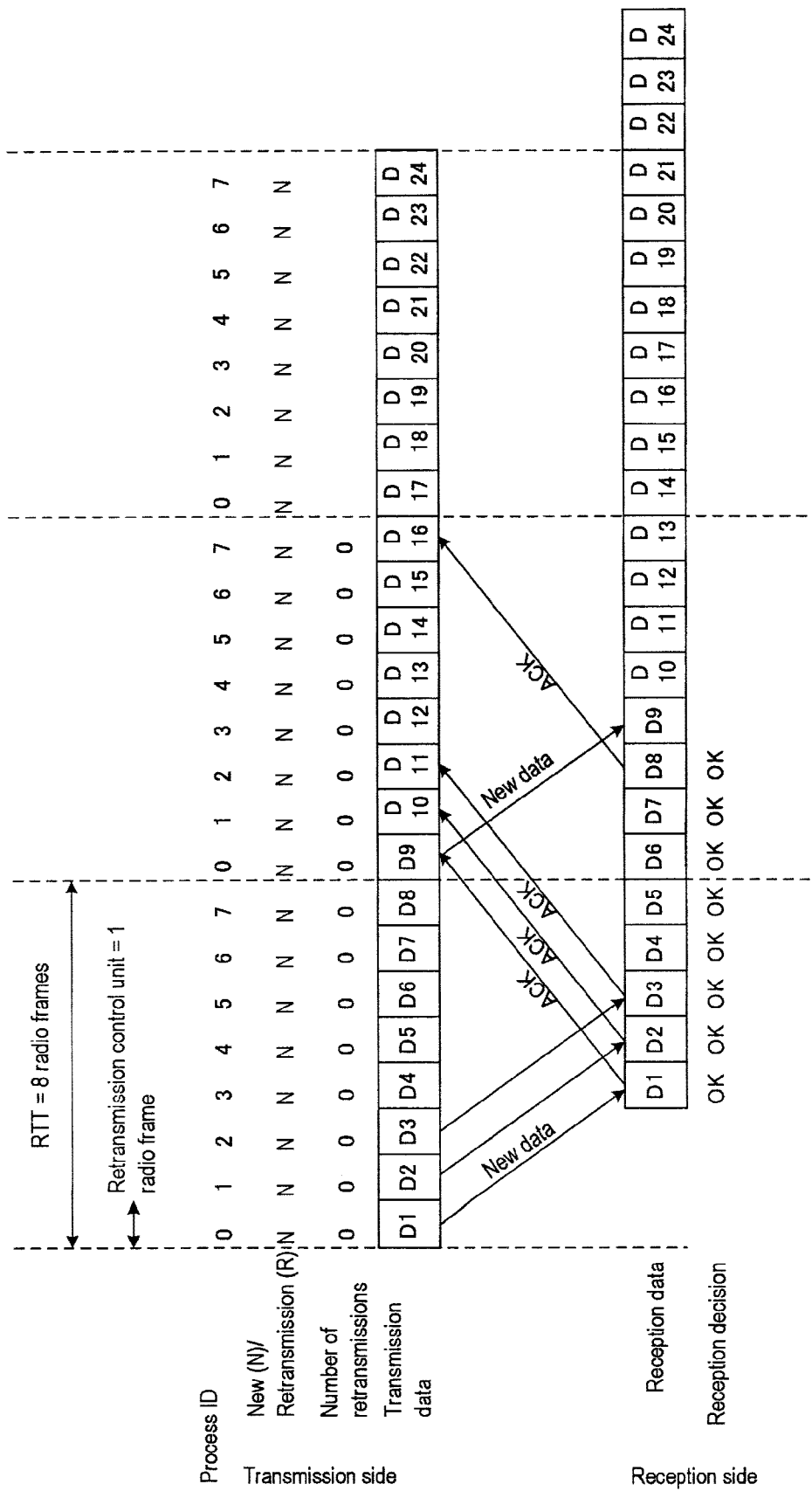
FIG. 1 is a diagram illustrating an exemplary state in the retransmission processing of the related art.
Figure 2:
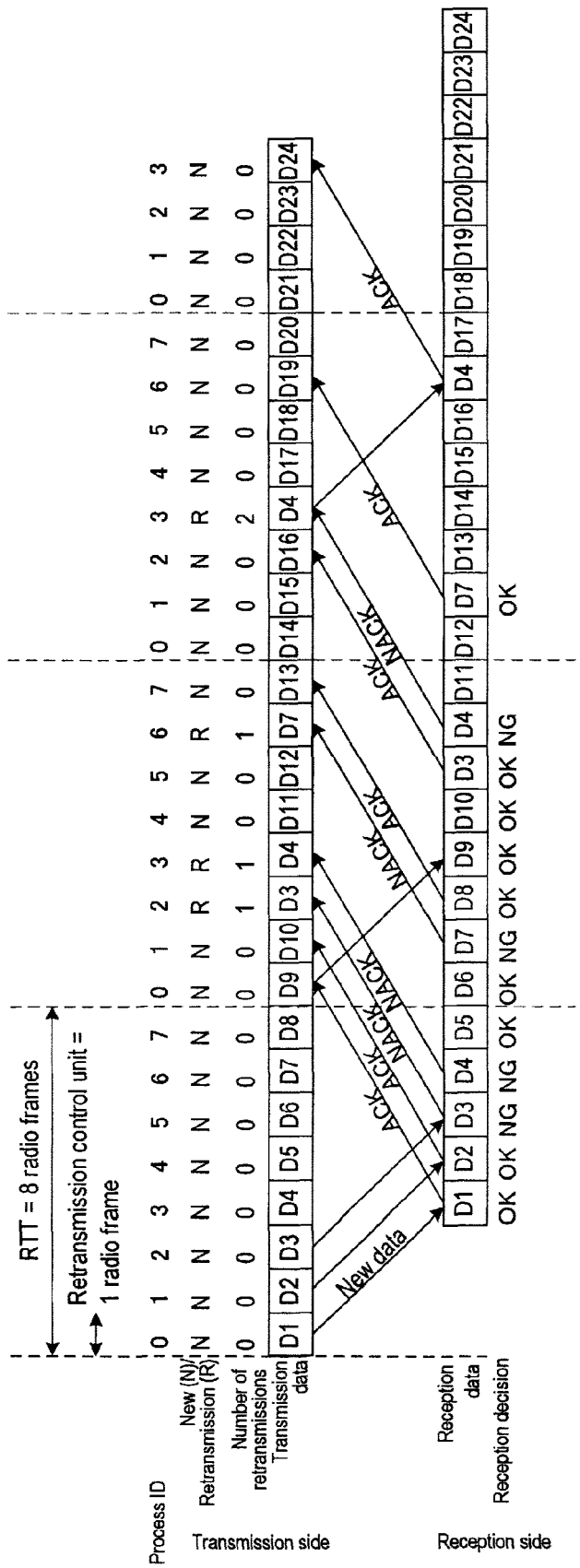
FIG. 2 is a diagram illustrating an exemplary state in the retransmission processing of the related art.
Figure 3:
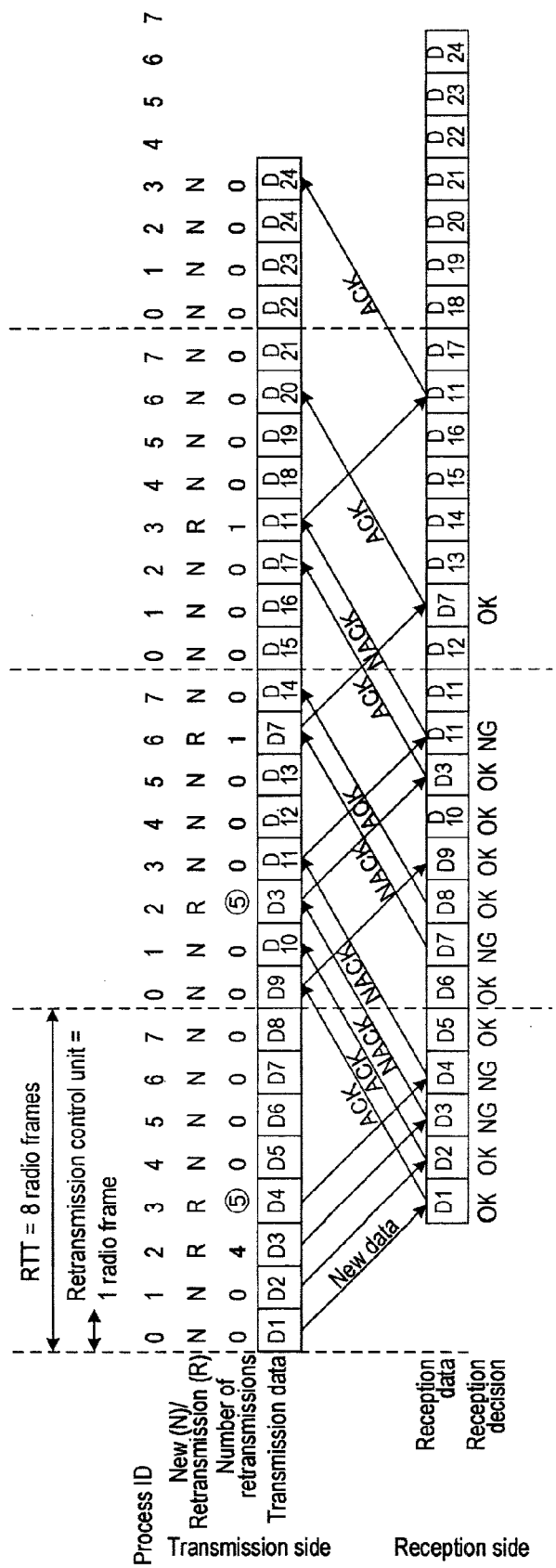
FIG. 3 is a diagram illustrating an exemplary state in the retransmission processing of the related art.
Figure 4:
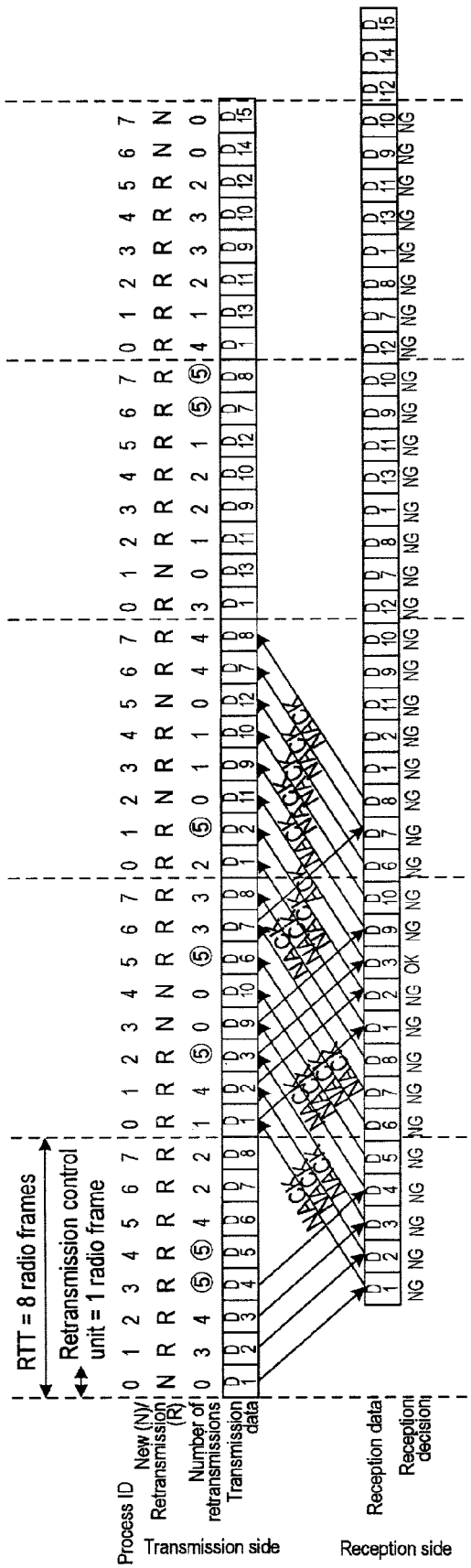
FIG. 4 is a diagram illustrating an exemplary state in the retransmission processing of the related art.

In the section 1 of the state 03, when the reception quality is improved and it becomes that the number of retransmissions ended in failure (Y)=0 and the number of retransmissions in the case of normal reception (X)=5<6.6, in the next section 2, the above number of retransmissions ended in failure (Y) and the number of retransmissions in the case of normal reception (X) are detected, based on the decision table illustrated in FIG. 4. In the section 2 also, the state 03 remains unchanged. Then, in the next section 4, a transition from the state 03 to the state 02 occurs, and in the section 4, the transition is completed. Thus, the number of dedicated retransmission frames becomes 2 from 4. In case of the transition in the direction that the number of the dedicated retransmission frames decreases, it is not necessary to wait for the release of the process ID of the dedicated retransmission frame during the section 4. By making usable the process ID having been made unused in the above description, it is possible to restore each dedicated retransmission frame to an ordinary radio frame assignable to a new data, immediately. Specifically, in the state 03, the process IDs 4-7 among the entire process IDs 0-7 are made unused, and however, by making the process IDs 4, 5 usable, the number of dedicated retransmission frames can be adjusted.

Further, in the section 7 of the state 02, when the reception quality is further improved, and it becomes that the number of retransmissions ended in failure (Y)=0 and the number of retransmissions in the case of normal reception (X)=3<5, in the next section 8, the above number of retransmissions ended in failure (Y) and the number of retransmissions in the case of normal reception (X) are detected, based on the decision table illustrated in FIG. 4. In the section 8 also, the state 02 remains unchanged. Then, in the next section 9, a transition from the state 02 to the state 01 occurs, and the transition is completed in the section 9. Thus, no dedicated retransmission frame exists any more, and the entire 8 radio frames become radio frames assignable to new data.

Figure 9:
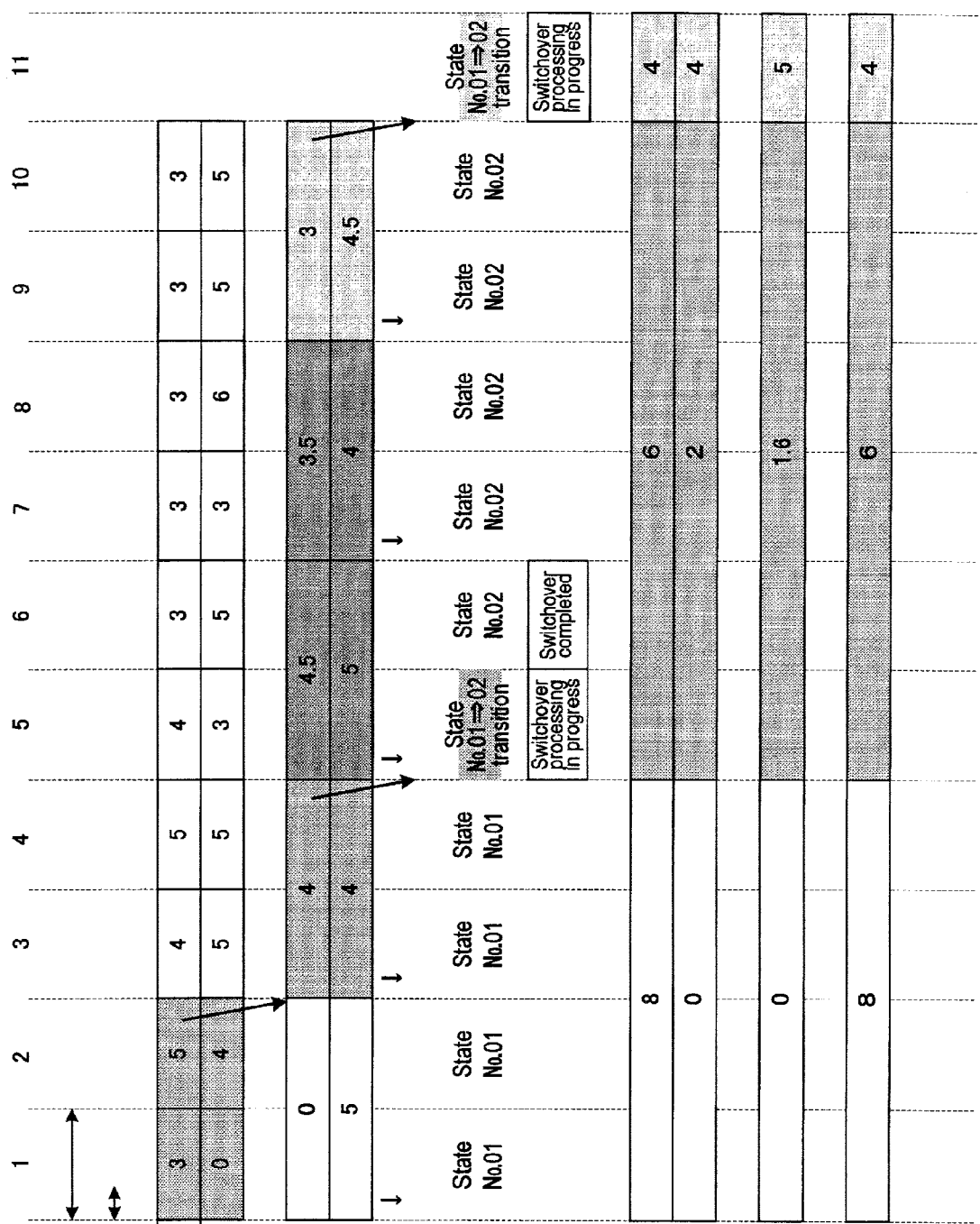
FIG. 9 is a diagram illustrating a third example (N=2) of the retransmission processing according to the embodiment of the present invention.

FIG. 9 is a diagram illustrating a third example (N=2) of the retransmission processing according to the embodiment of the present invention. In FIG. 9, there is illustrated a case of the transition of the state 01→the state 02 when N=2. The number of retransmissions ended in failure (Y) and the number of retransmissions in the case of normal reception (X) are obtained by the calculation of a mean value between 2 sections of (RTT×the maximum number of retransmissions), and the decision timing also becomes on the basis of 2 sections. Other operation is similar to the case of FIG. 7.

Figure 10:
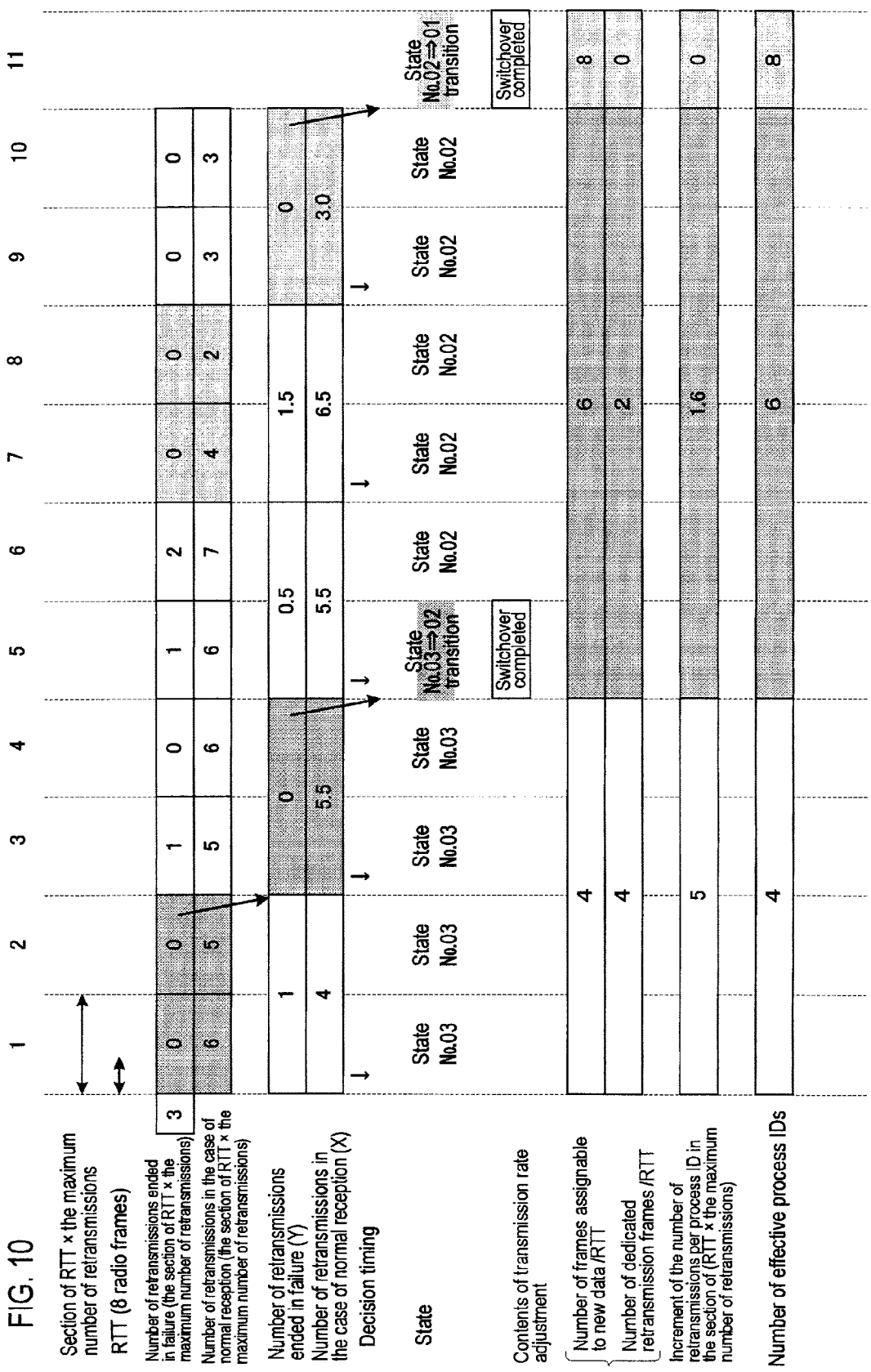
FIG. 10 is a diagram illustrating a fourth example (N=2) of the retransmission processing according to the embodiment of the present invention.

FIG. 10 is a diagram illustrating a fourth example (N=2) of the retransmission processing according to the embodiment of the present invention. In FIG. 10, there is illustrated a case of the transition of the state 03→the state 02→the state 01 when N=2. Similar to FIG. 9, the number of retransmissions ended in failure (Y) and the number of retransmissions in the case of normal reception (X) are obtained by the calculation of a mean value between 2 sections of (RTT×the maximum number of retransmissions), and the decision timing also becomes on the basis of 2 sections. Other operation is similar to the case of FIG. 8.

Figure 11:
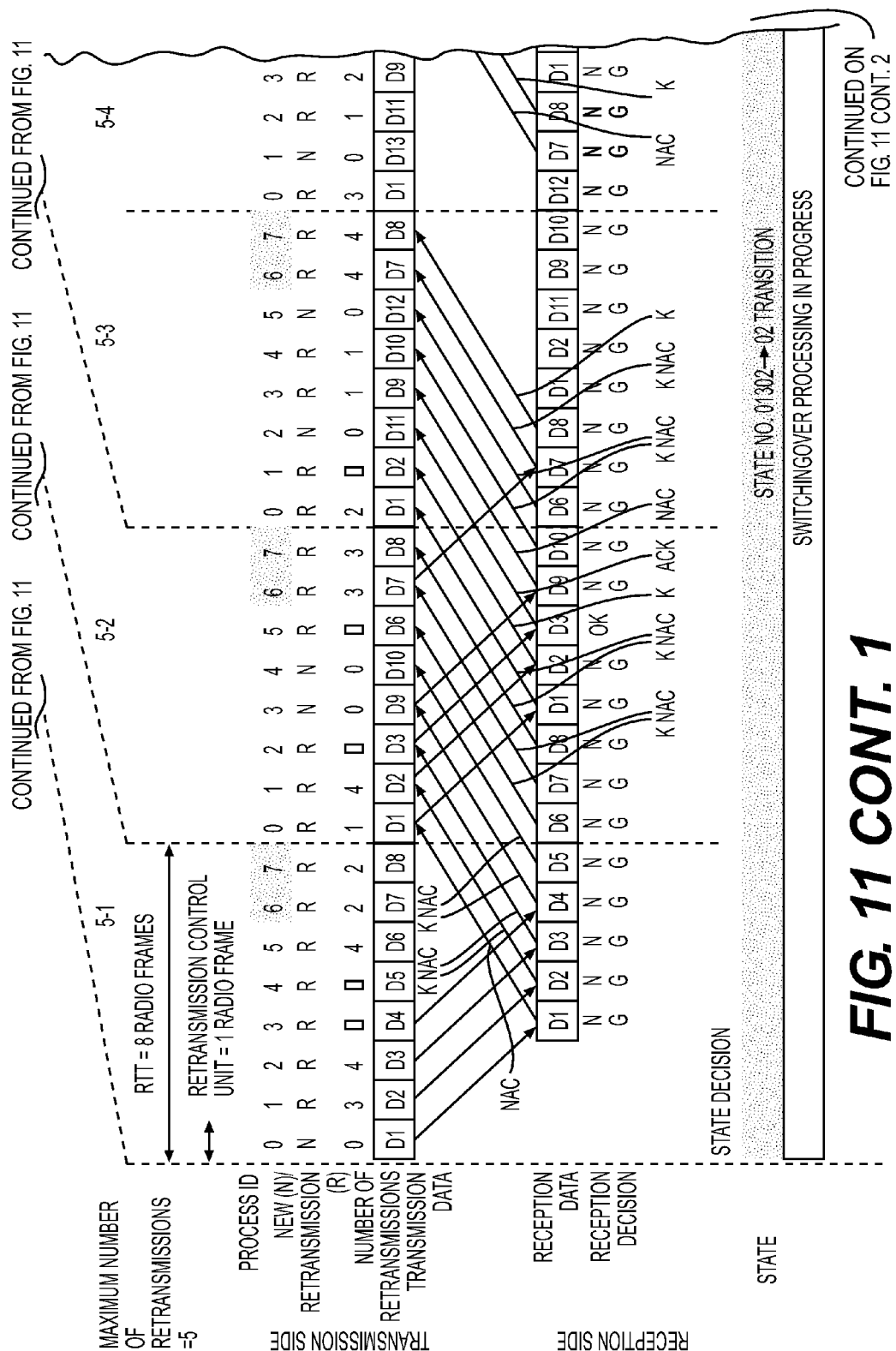
FIG. 11 is a diagram explaining detailed state transitions in the retransmission processing illustrated in FIG. 9.
Figure 11:
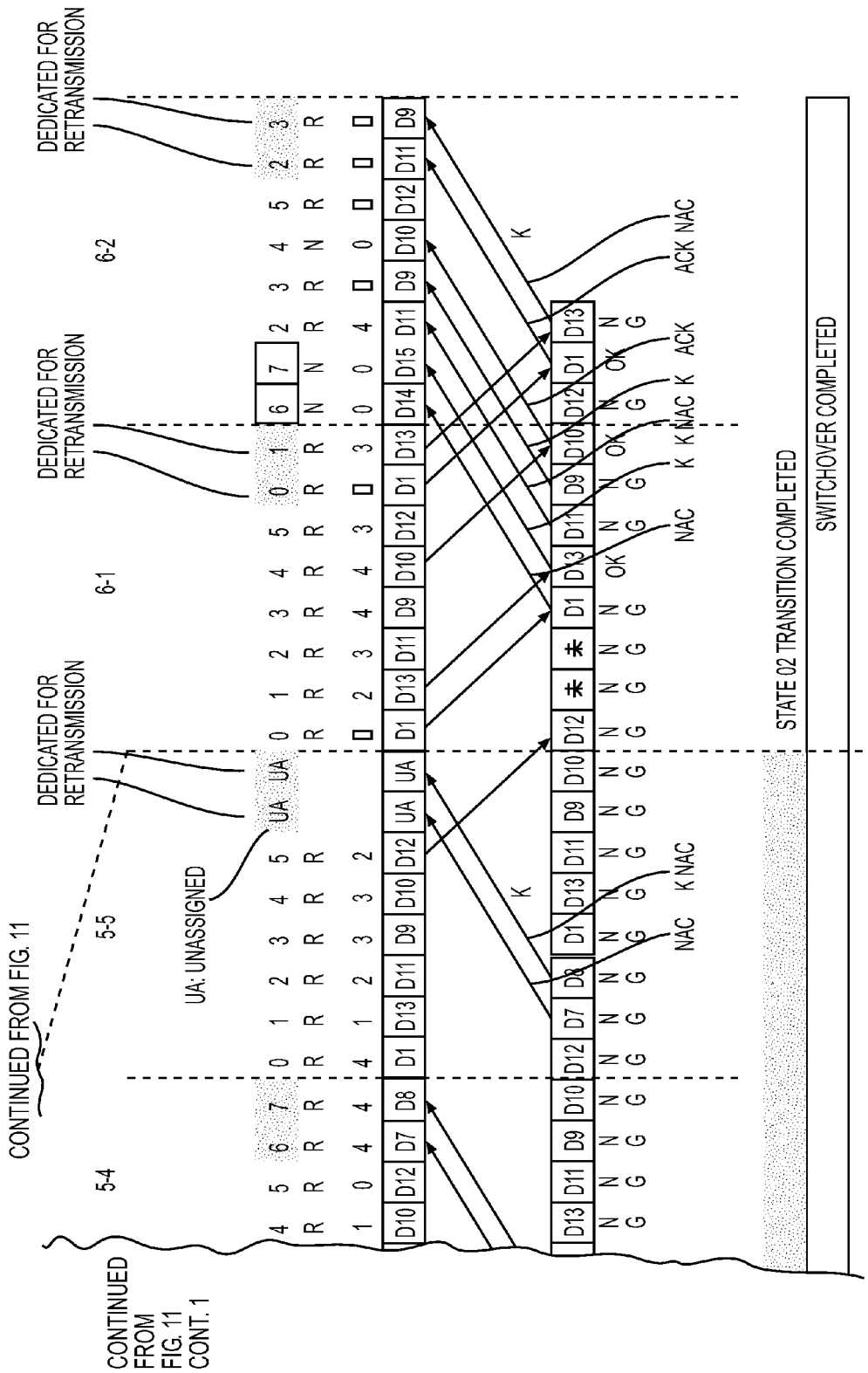

FIG. 11 is a diagram explaining detailed state transitions in the retransmission processing illustrated in FIG. 9. The retransmission processing in the sections 5, 6 of FIG. 9 is illustrated. In the section 5-1, state transition decision based on FIG. 6 is made using the mean value of the number of retransmissions ended in failure in the sections 3, 4, and thereby the transition from the state 01 to the state 02 is determined. To make the transition to the state 02, it is necessary to set 2 dedicated retransmission frames. Therefore, at the time the process IDs 6, 7 are released, radio frames corresponding to the process IDs 6, 7 are determined to be dedicated retransmission frames. To release the process IDs 6, 7, the period of RTT×the maximum number of retransmissions is required maximally. In the section 5-4 of the example illustrated in FIG. 11, the fifth retransmission (the maximum number of retransmissions) of the retransmission data D7, D8 assigned to the process IDs 6, 7 is performed. Then, in the section 5-5, by the reception of ACK corresponding to the above fifth retransmission, the process IDs 6, 7 are released (the release is performed even in case of NACK). In ordinary cases, new data are assigned to the released process IDs 6, 7. However, according to the present embodiment, by making the above process IDs unused, the released process IDs 6, 7 are not assigned to new data, and instead, used as dedicated retransmission frames.

At the time of the completion of the section 5, retransmission data of which normal reception was not attained are D1, D13, D11, D9, D11 and D12. Then, in the next section 6-1, the above retransmission data D1, D13, D11, D9, D11 and D12 are assigned to the process IDs 0-5. To 2 dedicated retransmission frames, new data are not assigned, and the retransmission data D1, D13 are assigned again. In regard to the retransmission data D1, by the assignment to the dedicated retransmission frame, the number of retransmissions becomes 6, and thus, the number of retransmissions greater than the maximum number of retransmissions is realized.

Among the retransmission data, of which normal reception was not attained at the time point of the assignment to the dedicated retransmission frames, the retransmission data to be assigned to the dedicated retransmission frames are assigned, for example, in the order from the earliest transmission sequence. In this case, the above data are the retransmission data D1, D13, as illustrated in the example of FIG. 11. Also, it may be possible to assign in the order from the largest number of retransmissions, irrespective of the transmission sequence. In this case, at the time point of assigning retransmission data to the dedicated retransmission frames, the retransmission data having a large number of retransmissions are D1 (5 times), D9 (4) and D10 (4). Therefore, D1, D9 or D1, D10 are to be assigned. If the number of retransmissions is combined with the transmission sequence, the result becomes D1 and D9.

Additionally, in the state 02 through the state 06 in which the dedicated retransmission frames are set, it is possible to retransmit up to the number of times not exceeding the maximum number of retransmissions+(an increment of the number of retransmissions per process ID). Accordingly, in the state 02, it is possible to retransmit up to the number of times not exceeding 6.6, that is, 6. In regard to the retransmission data D1, the sixth retransmission is carried out in the section 6-1 by use of the dedicated retransmission frame. Therefore, irrespective of whether the reception is successful or not in the sixth retransmission, the retransmission of the retransmission data D1 is terminated.

In the radio frame of the first RTT in the section 6-2, NACK is received for the fifth retransmission of the retransmission data D1. As described above, no retransmission of the retransmission data D1 is carried out any more. At this time, at the time point of the first RTT in the section 6-1, because ACK/NACK was not received in response to the sixth retransmission (final retransmission) of the retransmission data D1 by use of the dedicated retransmission frame, the process ID 0 is not released. Accordingly, to the radio frame corresponding to the first RTT in the section 6-2, a process ID (for example, 6) which is unused at this time point is assigned, and further, the radio frame corresponding to the first RTT in the section 6-2 is modified from the process ID 0 to the process ID 6. Then, a new data D14 is assigned to the radio frame having the modified process ID 6. Additionally, at the time point of the reception of ACK/NACK for the sixth retransmission of the retransmission data D1, the process ID 0 is made unused. By this, it is possible to maintain the number of process IDs assignable to new data to be 6.

In the radio frame of the second RTT of the section 6-2, because ACK for the retransmission data D13 is received, a new data D15 is assigned. At this time, similar to the above description, the process ID 1 is not released because ACK/NACK has not been received in response to the third retransmission of the retransmission data D13 by use of the dedicated retransmission frame. Accordingly, to the radio frame corresponding to the second RTT in the section 6-2, a process ID (7, for example) which is unused at this time point is assigned, and further, the radio frame corresponding to the second RTT in the section 6-2 is modified from the process ID 1 to the process ID 7. To the radio frame having the modified process ID 7, the new data D15 is assigned. Additionally, at the time point of the reception of ACK/NACK for the third retransmission of the retransmission data D13, the process ID 1 is made unused. By this, it is possible to maintain the number of process IDs assignable to new data to be 6.

In the radio frames of the third and the fourth RTTs in the section 6-2, NACK for each retransmission data D11, D9 is received, and therefore, the retransmission data D11, D9 are retransmitted again. In the radio frame of the fifth RTT in the section 6-2, ACK for the retransmission data D10 is received, and therefore, a new data D16 is assigned. In the radio frame of the sixth RTT in the section 6-2, NACK for the retransmission data D12 is received, and therefore, the retransmission data D12 is retransmitted again.

Then, to the dedicated retransmission frames in the section 6-2, there are assigned such retransmission data that normal reception thereof was not attained at the time point of the assignment of retransmission data to the dedicated retransmission frames, and that the number of retransmissions does not exceed the maximum number of retransmissions+(an increment of the number of retransmissions per process ID). In the example illustrated in FIG. 11, the retransmission data D11 and D9 are assigned. In regard to the retransmission data D9, by the retransmission using the dedicated retransmission frame, the number of retransmissions becomes 6, which is the final retransmission.

In the above-mentioned embodiment, as a parameter for deciding whether or not the dedicated retransmission frame is to be set, an example of using the number of retransmissions ended in failure has been explained. However, the parameter is not limited to the number of retransmissions ended in failure. For example, based on the number of retransmissions in the case of normal reception (successful reception) in the section of (RTT×the maximum number of retransmissions), it may be possible to make a state transition to the direction of setting the dedicated retransmission frames. Even in the situation of successful reception within the maximum number of retransmissions, if the number of retransmissions at the time of successful reception equals the maximum number of retransmissions or close thereto, it is considered that the reception situation is relatively deteriorating. Accordingly, the number of retransmissions is increased in advance before retransmission failure occurs, and thus, it becomes possible to reduce the probability of the retransmission failure.

Further, as a parameter, it may also be possible to use the number of radio frames reaching the maximum number of retransmissions in the section of (RTT×the maximum number of retransmissions). In this case, irrespective of success/failure of the reception, the number of radio frames having the number of retransmissions reaching the maximum number of retransmissions is counted.

Figure 12:
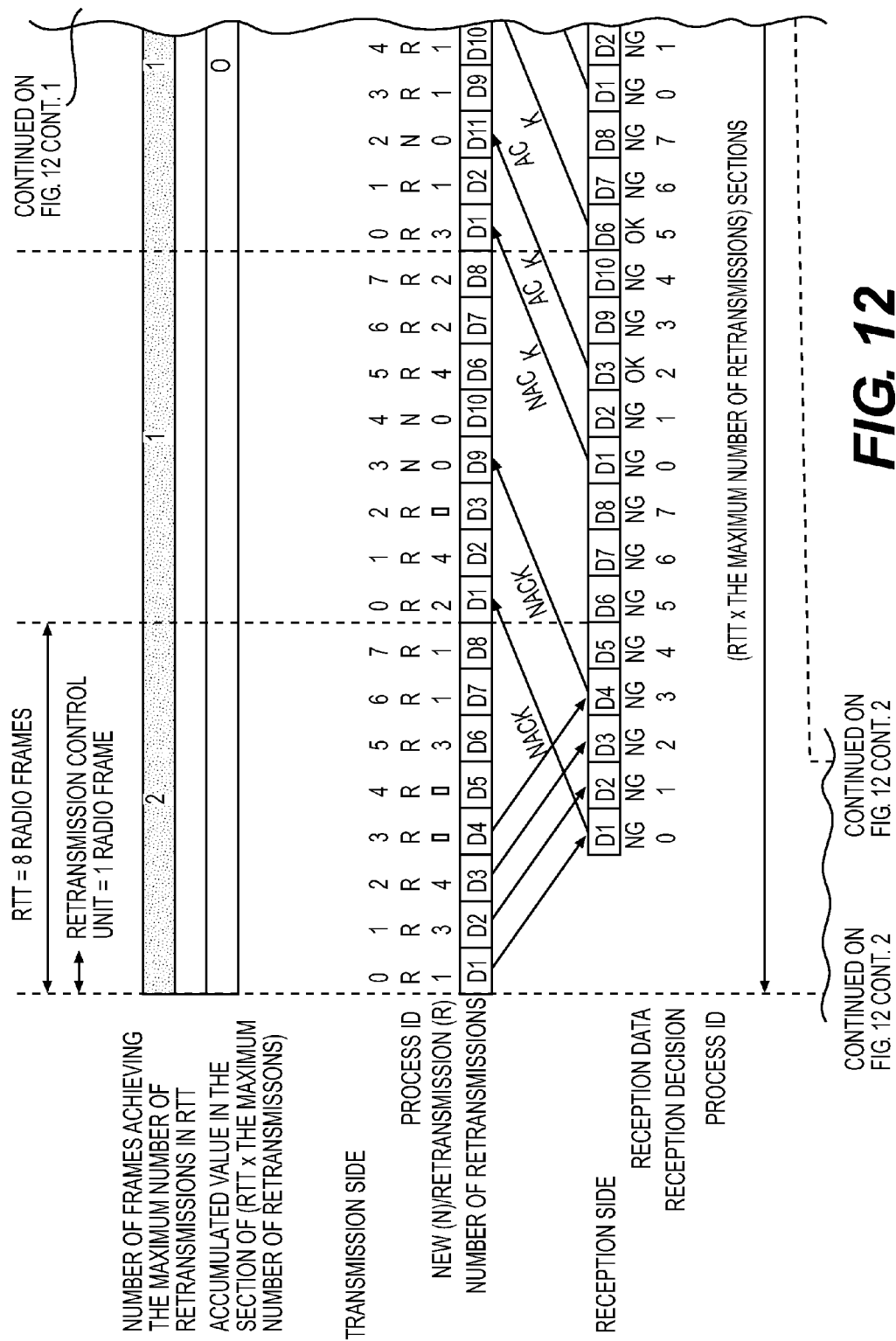
FIG. 12 is a diagram illustrating an example of the retransmission processing when the number of radio frames reaching the maximum number.
Figure 12:
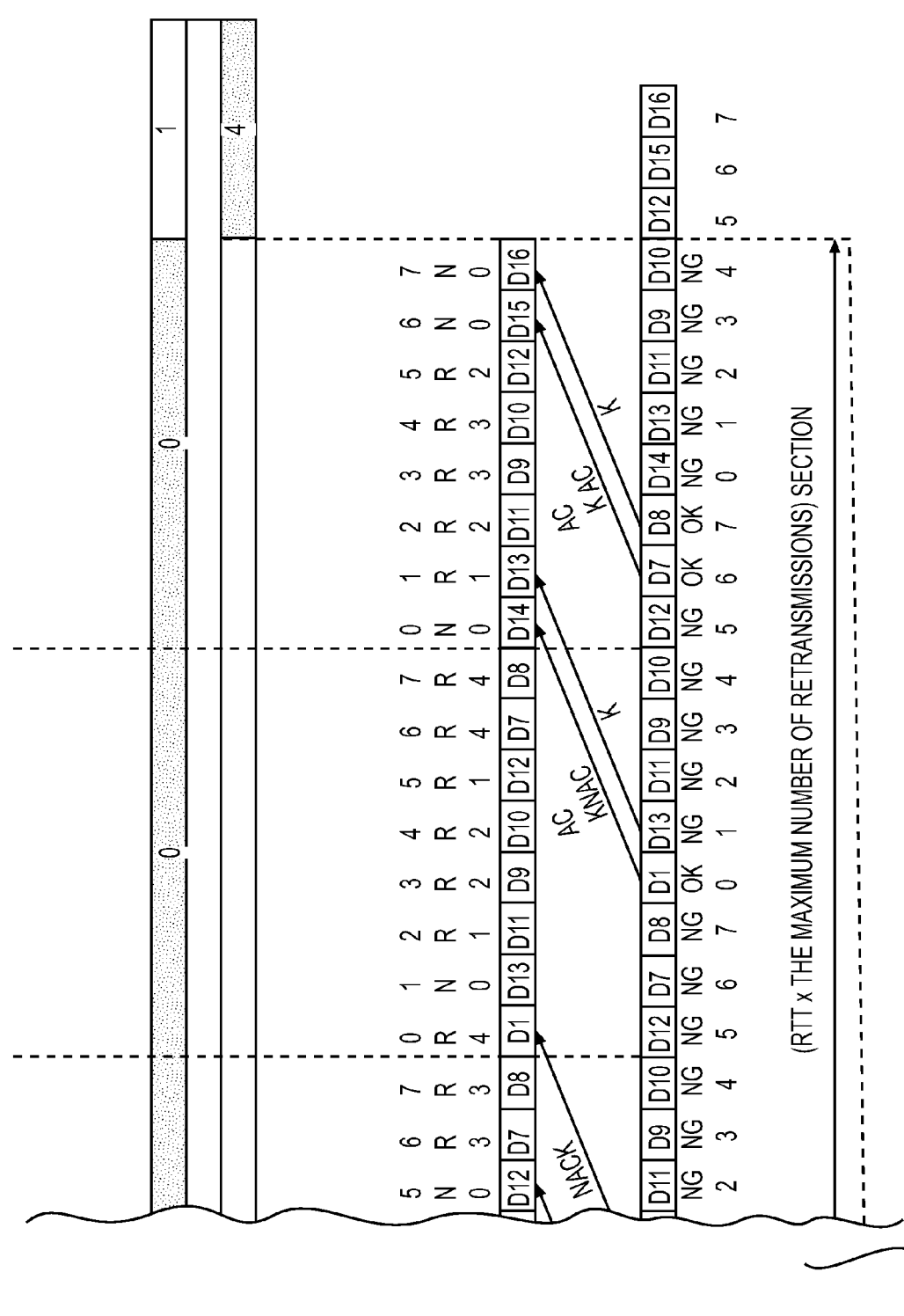
Figure 12:
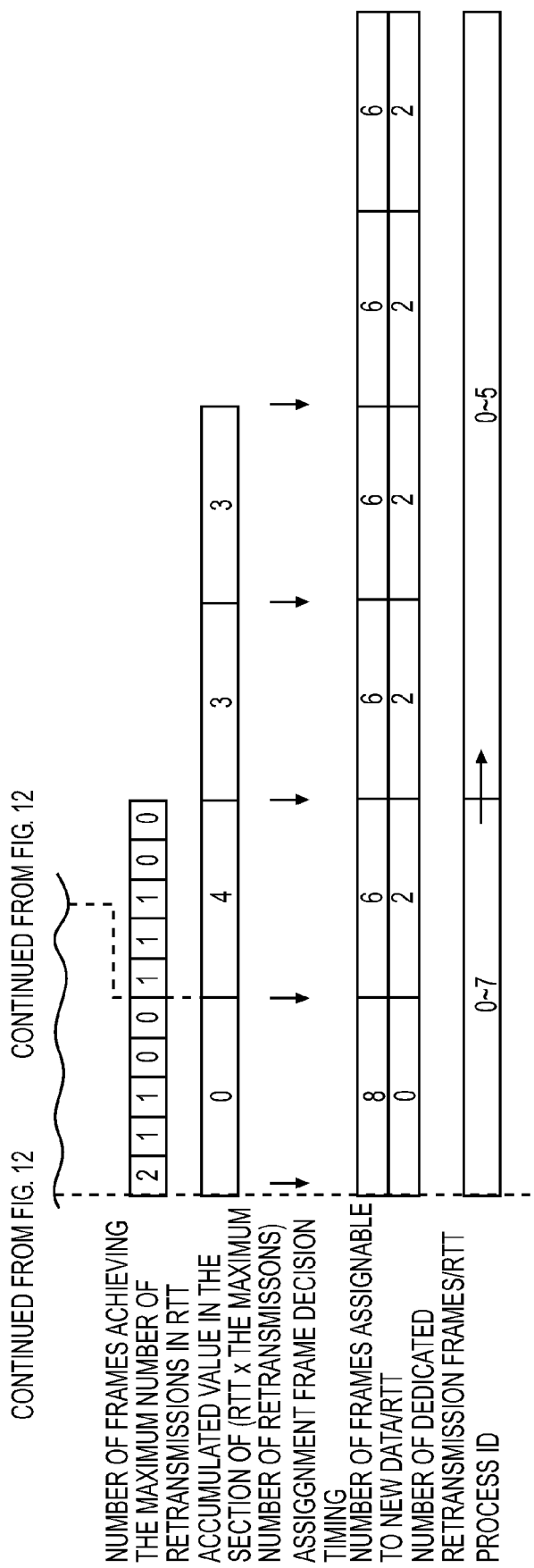

FIG. 12 is a diagram illustrating an example of the retransmission processing when the number of radio frames reaching the maximum number of retransmissions is used. In the state that the dedicated retransmission frame is not set, when it becomes that (the number of radio frames reaching the maximum number of retransmissions)=4, in the next section and thereafter, 2 dedicated retransmission frames are set. By this, the number of radio frames being assignable to new data is reduced by 2 (transition from the state 01 to the state 02).

As a parameter for deciding a reception quality level, it is not limited to a parameter in relation to the number of retransmissions, such as the number of retransmissions ended in failure, the number of retransmissions in the case of normal reception, and the number of radio frames reaching the maximum number of retransmissions. It may be possible to use SINR (Signal Noise Ratio) which is measured by the SINR measurement unit 26. If SINR is small, the probability of normal reception becomes small, and therefore, it is considered the number of retransmissions is increased. Accordingly, in place of the parameter related to the number of retransmissions, it may be possible to provide a decision criterion (which corresponds to the decision table illustrated in FIG. 6) such that the number of dedicated retransmission frames becomes greater as SINR becomes smaller.

Further, it may be possible to provide a decision criterion in which the parameter related to the number of retransmissions is combined with SINR. In the decision table illustrated in FIG. 6, the state transition in regard to the dedicated retransmission frame setting is decided only by the number of retransmissions ended in failure. However, if SINR is also taken into account, it becomes possible to prevent an excessive state transition caused by an instantaneous improvement or deterioration of SINR.

As such, according to the present invention, the reception quality level is decided based on the parameter related to the number of retransmissions and the parameter such as SINR, and according to the above decision result, the number of retransmissions is increased in an adaptive manner. In contrast, the reception processing (such as retransmission and combination processing) of the retransmitted data on the receiving side can be realized by the conventional processing, by use of retransmission management information (for example, a process ID to identify a retransmission management unit, or a new data identifier etc. to identify whether the reception data is new or retransmitted) which is reported from the transmitting side through a control channel.

Further, it is possible to realize the sizes of retransmission buffer 11 of the transmitting side apparatus 10, retransmission and combination buffer 22 of the receiving side apparatus 20, and sequence control buffer 24 with the same capacity as conventional. Considering the case of RTT=8 radio frames and the maximum number of retransmissions=5, when retransmission occurs only one radio frame in RTT, and further, when the reception becomes successful at the maximum number of retransmissions, in regard to other 7 radio frames in which retransmission does not occur, new data are transmitted at all times. To the succeeding stage of the processing on the receiving side, because it is necessary to reproduce the data sequence at the time of transmission, and therefore because it is necessary to store both the retransmitted data for one radio frame and the new data transmitted and received during the time of 7 radio frames×RTT, sequence control buffer 24 is required to have a size capable of storing data transmitted and received during the radio frames of RTT×the maximum number of retransmissions. According to the present invention, the conventional number of retransmissions in the time of (RTT×the maximum number of retransmissions) is adaptively increased, while the maximum number of radio frames to be received by the receiving side apparatus 20 is not changed from the conventional number. Therefore, the sequence control buffer can be realized with the same size as conventional.

Also, by the setting of the dedicated retransmission frames, newly assignable radio frames is reduced, which decreases the transmission rate. This provides a function of restricting the occurrence of new retransmission caused by wasteful transmission of new data. Further, the restriction of a retransmission failure rate between a base station and a mobile station (layer 1) causes a reduced retransmission occurrence rate in the upper layer (layer 2), which leads to an improved throughput as a system including the upper layer.

Further, by the combination with the existing means for adjusting the transmission rate, it becomes possible to adjust the transmission rate more flexibly in combination of the HARQ system. For example, as the existing means for adjusting the transmission rate according to the reception quality, there is an adaptive modulation system in which transmission is carried out after an optimal modulation system is selected according to reception quality (a characteristic state of a transmission line). When a transmission line condition is good, a larger amount of information can be transmitted by selecting a modulation system enabling higher speed transmission such as 16-QAM. Also, when a transmission line condition is deteriorated, transmission with maintained communication quality by a reduced transmission speed can be obtained, by selecting a modulation system such as QPSK. In case the present invention is combined with the adaptive modulation, for example, consider a case that a period of the adaptive modulation decision (a decision period for switching the modulation system) is sufficiently larger than a threshold decision period according to the present invention. If the reception quality is changed from a good condition to an exceedingly deteriorated condition, there may occur a section in which, in spite of an exceedingly deteriorated reception characteristic, transmission is carried out under the selection of a higher rate modulation system (16-QAM etc., for example). It is also predictable that retransmission of the transmitted data may occur with high probability. In such a case, by means of temporarily restricting the transmission rate in the section concerned (adaptive modulation decision period) through the threshold decision according to the present invention, a retransmission occurrence rate can be reduced. Also, the combination gain through retransmission can be increased by an increased number of retransmissions. Thus, more flexible and adaptive throughput improvement control can be attained. Also, oppositely, consider a case that the adaptive modulation decision period (a decision period for switching the modulation system) is smaller than the threshold decision period according to the present invention. Under such a circumstance that a minimum rate modulation system (QPSK etc., for example) is selected although a deteriorated transmission line characteristic continues, on the occurrence of a state that a retransmission failure begins (i.e. a state of limitation capable of maintaining the communication quality by the adaptive modulation), by applying the present invention, the retransmission occurrence rate can be reduced by the restriction of extra transmission, similar to the previous case. Also, the retransmission occurrence rate can be reduced by increasing the combination gain through retransmission by an increased number of retransmissions.

Also, according to the present embodiment, the decision on the necessity for setting the dedicated retransmission frames by the decision table illustrated in FIG. 6 is made in the dedicated retransmission frame setting unit 15 of the transmitting side apparatus 10. However, the dedicated retransmission frame setting unit 15 may be provided in the receiving side apparatus 20. Namely, on the receiving side, the necessity for setting the dedicated retransmission frame is decided using ACK/NACK and SINR, and the above decision result (state transition information) is reported to the transmitting side through the control channel as retransmission management information. By this, the similar control is possible. Here, in this case also, it is the dedicated retransmission frame setting unit 15 in the transmitting side apparatus 10 that sets the dedicated retransmission frames after receiving the above retransmission management information.

FIG. 13 is a diagram illustrating retransmission management information which is reported using the control channel. The retransmission management information includes the decision result of the necessity for setting the dedicated retransmission frames (i.e. state transition information), in addition to usually included information such as ACK/NACK.

When the maximum transmission rate at the mobile communication apparatus does not need the entire radio frames in the RTT time (when there exists a case that an idle radio frame occurs), and further, when it is possible to occupy the radio resource in the above idle portion, it is possible to increase the number of retransmissions without reducing the transmission rate of new data, by assigning the above idle frame fixedly and continuously, as a dedicated retransmission frame.

Additionally, in the above case, when there is no change in the maximum number of retransmissions, it is possible to reduce the size of the sequence control buffer corresponding to the increment of retransmissions per process ID which is increased by assigning the idle frame to the dedicated retransmission frame. For example, when considering a case that idle frames exist in half of the radio frames within the RTT time, if the idle frames are assigned to the dedicated retransmission frames (the most severe case is a case that retransmission occurs in the entire radio frames used in RTT at the time of the maximum transmission rate, and the idle frames i.e. the dedicated retransmission frames are assigned uniformly to each retransmission data), the maximum number of retransmissions per radio frame in the time of (RTT×the maximum number of retransmissions×the radio frame length) is increased twice as many as conventional. In the above case, because the transmission for the maximum number of retransmissions is completed within half as much time as conventional, and accordingly, the buffer capacity can be reduced to ½.

Further, by increasing the number of retransmissions using the idle frames as the dedicated retransmission frames, the number of retransmissions assigned in the RTT time is increased, and accordingly, the retransmission time can be reduced.

When transmission and reception are carried out by mixing data of different quality classes (QoS) in the mobile communication apparatus, it becomes possible to reduce the retransmission failure rate of a high quality class in a preferential manner, by adjusting the quality of retransmission and combination according to each quality class on the basis of an assignment ratio of the dedicated retransmission frame to each QoS.

According to the embodiments, when a receiving condition is deteriorated to the extent that reception does not succeed even by means of combination after retransmission, a combination gain through retransmission is improved and a retransmission failure rate is decreased by restricting a transmission rate of new data, and setting dedicated retransmission frame, thereby enabling a greater number of retransmission. Additionally, unusable retransmission is restricted by restricting the transmission rate of new data in a state of having high possibility of retransmission, thereby improving high transmission efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:
a setting unit setting a portion of the plurality of radio frames to be a dedicated retransmission frame according to a data reception quality level at the receiving side apparatus; and
a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response,
a transmission rate adjustment unit assigning a new data to only a radio frame other than the dedicated retransmission frame,
wherein, by setting the dedicated retransmission frame, the number of capable retransmissions of the data is made to increase more than the maximum number of retransmissions before the dedicated retransmission frame is set.

2. The mobile communication apparatus according to claim 1,
wherein the setting unit decides the reception quality level based on a parameter in regard to the number of retransmissions of the data corresponding to the failure response, and when the reception quality level does not satisfy a first criterion, the setting unit sets the dedicated retransmission frame.

3. The mobile communication apparatus according to claim 1,
wherein, when the number of retransmissions of normally received data is a predetermined number or more, the setting unit sets the dedicated retransmission frame.

4. The mobile communication apparatus according to claim 1,
wherein, after the dedicated retransmission frame is set, on deciding that the reception quality level satisfies a predetermined criterion, the setting unit reduces the number of the set dedicated retransmission frames.

5. The mobile communication apparatus according to claim 1,
wherein the setting unit changes the number of dedicated retransmission frames to be set stepwise according to the reception quality level.

6. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:
a setting unit setting a portion of the plurality of radio frames to be a dedicated retransmission frame according to a data reception quality level at the receiving side apparatus; and
a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response,
wherein, by setting the dedicated retransmission frame, the number of capable retransmissions of the data is made to increase more than the maximum number of retransmissions before the dedicated retransmission frame is set, and
wherein, on receipt of a success response from the apparatus on the receiving side, the success response indicating the data has been received normally by the receiving side apparatus, the setting unit does not assign a new data to a radio frame corresponding to the reception timing of the success response, and instead, sets the radio frame to be the dedicated retransmission frame.

7. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:
a setting unit setting a portion of the plurality of radio frames to be a dedicated retransmission frame according to a data reception quality level at the receiving side apparatus; and
a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response,
wherein, by setting the dedicated retransmission frame, the number of capable retransmissions of the data is made to increase more than the maximum number of retransmissions before the dedicated retransmission frame is set, and
wherein, when the setting unit receives the failure response from the receiving side apparatus, and the number of retransmissions of the data corresponding to the failure response reaches the maximum number of retransmissions, the setting unit does not assign a new data to a radio frame corresponding to the reception timing of the failure response, and instead, sets the radio frame to be the dedicated retransmission frame.

8. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:
a setting unit setting a portion of the plurality of radio frames to be a dedicated retransmission frame according to a data reception quality level at the receiving side apparatus; and
a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response,
wherein, by setting the dedicated retransmission frame, the number of capable retransmissions of the data is made to increase more than the maximum number of retransmissions before the dedicated retransmission frame is set, and
wherein the setting unit decides the reception quality level based on a Signal Noise Ratio measured by the receiving side apparatus, and when the reception quality level does not satisfy a first criterion, the setting unit sets the dedicated retransmission frame.

9. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:
a setting unit setting a portion of the plurality of radio frames to be a dedicated retransmission frame according to a data reception quality level at the receiving side apparatus; and
a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response, wherein, by setting the dedicated retransmission frame, the number of capable retransmissions of the data is made to increase more than the maximum number of retransmissions before the dedicated retransmission frame is set, and wherein the setting unit decides the reception quality level based on the number of retransmissions of the data corresponding to the failure response and a Signal Noise Ratio measured by the receiving side apparatus, and when the reception quality level does not satisfy a first criterion, the setting unit sets the dedicated retransmission frame.

10. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:

a setting unit setting a portion of the plurality of radio frames to be a dedicated retransmission frame according to a data reception quality level at the receiving side apparatus; and a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response, wherein, by setting the dedicated retransmission frame, the number of capable retransmissions of the data is made to increase more than the maximum number of retransmissions before the dedicated retransmission frame is set, and wherein, when the number of data not received normally is a predetermined number or more even after the number of retransmissions reaches the maximum number of retransmissions, the setting unit sets the dedicated retransmission frame.

11. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:

a setting unit setting a portion of the plurality of radio frames to be a dedicated retransmission frame according to a data reception quality level at the receiving side apparatus; and a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response, wherein, by setting the dedicated retransmission frame, the number of capable retransmissions of the data is made to increase more than the maximum number of retransmissions before the dedicated retransmission frame is set, and wherein, when the number of normally received data is a predetermined number or more after being retransmitted to the maximum number of retransmissions, the setting unit sets the dedicated retransmission frame.

12. A Mobile communication apparatus assigning a data to a radio frame to transmit the data to a receiving side apparatus, and assigning again the data to a radio frame corresponding to a reception timing of a failure response from the receiving side apparatus to retransmit the data to the receiving side apparatus, the failure response indicating the data has not been received normally by the receiving side apparatus, the mobile communication apparatus comprising:

a setting unit setting a portion of the plurality of radio frames to be a dedicated retransmission frame according to a data reception quality level at the receiving side apparatus; and a retransmission controller assigning again the data to a radio frame corresponding to the reception timing of the failure response to retransmit the data to the receiving side apparatus, and further assigning the data to the dedicated retransmission frame to retransmit the data to the receiving side apparatus on receipt of the failure response, wherein, by setting the dedicated retransmission frame, the number of capable retransmissions of the data is made to increase more than the maximum number of retransmissions before the dedicated retransmission frame is set, and wherein, after the dedicated retransmission frames are set, when the setting unit decides that the number of retransmissions of normally received data is smaller than a predetermined number, the setting unit reduces the number of the set dedicated retransmission frames.

\* \* \* \* \*